(12) United States Patent
Linke (10) Patent No.: US 11,521,588 B2
(45) Date of Patent: Dec. 6, 2022

(54) SOUND ATTENUATOR FOR A FLUID FLOW LINE AND METHOD OF MANUFACTURING THE SAME

(71) Applicant: Umfotec GmbH, Northeim (DE)

(72) Inventor: Berend Linke, Noerten-Hardenberg (DE)

(73) Assignee: Umfotec GmbH, Northeim (DE)

(*) Notice: Subject to any disclaimer, the term of this patent is extended or adjusted under 35 U.S.C. 154(b) by 1 day.

(21) Appl. No.: 17/192,783

(22) Filed: Mar. 4, 2021

(65) Prior Publication Data

US 2021/0280160 A1   Sep. 9, 2021

(30) Foreign Application Priority Data

Mar. 5, 2020   (DE) ............... 10 2020 106 017.3

(51) Int. Cl.
  *G10K 11/16*   (2006.01)
  *B21D 39/04*   (2006.01)

(52) U.S. Cl.
  CPC ............ *G10K 11/161* (2013.01); *B21D 39/04* (2013.01)

(58) Field of Classification Search
  CPC ...... F01N 1/023; F01N 1/026; F01N 2470/08; F01N 2470/24; G10K 11/161
  See application file for complete search history.

(56) References Cited

U.S. PATENT DOCUMENTS

| | | | | |
|---|---|---|---|---|
| 2,233,804 A | * | 3/1941 | Bourne | F16L 55/033 138/30 |
| 3,523,590 A | * | 8/1970 | Straw | F01N 13/185 29/422 |
| 10,352,210 B2 | * | 7/2019 | Hanschen | F01N 1/006 |
| 10,364,928 B2 | * | 7/2019 | Grieswald | F16L 55/033 |
| 10,403,256 B2 | * | 9/2019 | Denker | F02M 35/1266 |
| 2005/0150718 A1 | * | 7/2005 | Knight | F02M 35/1216 181/276 |
| 2014/0196978 A1 | * | 7/2014 | Hartmann | F02M 35/1036 29/890.08 |

FOREIGN PATENT DOCUMENTS

| | | |
|---|---|---|
| CN | 101176961 | 5/2008 |
| CN | 202520408 | 11/2012 |
| DE | 198 55 708 | 6/2000 |
| DE | 102019100739 A1 * | 7/2020 |

(Continued)

OTHER PUBLICATIONS

German Office Action dated Oct. 27, 2020.

*Primary Examiner* — Jeremy A Luks
(74) *Attorney, Agent, or Firm* — Gerald E. Hespos; Michael J. Porco (57) ABSTRACT

A sound attenuator has an inner pipe (12) with expansion sections (121) of enlarged diameter corresponding to the constriction sections (141) of an outer pipe (14). The expansion sections (121) in pairs axially delimit an intermediate inner pipe section (122) containing a wall opening (18) and having a reduced diameter relative to the expansion sections (121). The inner surface of the outer pipe (14) in each of its constriction sections (141) is connected to the outer surface of the inner pipe (12) in its respective corresponding expansion section (121). A method of manufacturing such a sound attenuator (10) also is provided and uses internal high-pressure forming.

8 Claims, 4 Drawing Sheets

(56) References Cited

FOREIGN PATENT DOCUMENTS

| EP | 2630398 B1 * | 4/2015 | ....... F02M 35/10295 |
|---|---|---|---|
| FR | 2924764 A1 * | 6/2009 | ......... F02M 35/1216 |
| WO | WO-2015092488 A1 * | 6/2015 | ......... F02M 35/1266 |
| WO | WO-2019145259 A1 * | 8/2019 | ......... B60H 1/00571 |
| WO | WO-2020148129 A1 * | 7/2020 | |

\* cited by examiner

SOUND ATTENUATOR FOR A FLUID FLOW LINE AND METHOD OF MANUFACTURING THE SAME

BACKGROUND

Field of the Invention

The invention relates to a sound attenuator for a fluid flow line comprising an inner pipe and an outer pipe coaxially encompassing the inner pipe. The outer pipe has an inner surface that is radially spaced from the outer surface of the inner pipe over the major part of its length. The outer pipe has at least two constriction sections of reduced diameter spaced apart from each other axially, and in which its inner surface is connected to the outer surface of the inner pipe to form at least one axially and radially outwardly closed ring chamber that is in fluid-exchanging contact with the interior of the inner pipe via at least one opening in the wall thereof.

The invention further relates to a method of manufacturing a sound attenuator for a fluid flow line, comprising the steps of:
 providing an outer pipe blank,
 expanding the outer pipe blank in certain sections by means of an internal high-pressure forming method to produce an outer pipe with at least one expanded intermediate outer pipe section that is delimited axially on both sides by two constriction sections having a reduced diameter in relation thereto,
 coaxially sliding the outer pipe onto an inner pipe which is provided with at least one wall opening arranged in an intermediate inner pipe section such that the inner surface of the outer pipe abuts in its constriction sections against the outer surface of the inner pipe and the wall opening is positioned between the constriction sections,
 connecting the outer surface of the inner pipe to the inner surface of the outer pipe in the constriction sections.

Related Art

A class-specific sound attenuator and a method for its manufacture are known from DE 198 55 708 B4.

In the context of the present description, the term "sound attenuator" is to be understood generally in the sense of a device for reducing airborne and structure-borne sound and is in no way to be understood as restricting such a device to those devices which effect sound reduction predominantly by absorption-related damping in a strictly physical sense. In fact, both class-specific sound attenuators and sound attenuators according to the invention work primarily according to the principle of the so-called Helmholtz resonator. They essentially consist of an inner pipe, which is part of a fluid flow line, and an outer pipe, which concentrically encompasses a longitudinal portion of the inner pipe and has at least two axially spaced radial walls via which it is connected to the outer wall of the inner pipe, such that a ring chamber is formed between the inner pipe and the outer pipe, the axial end walls of which are formed by said radial walls. The wall of the inner pipe is open in the area of the ring chamber, such that the ring chamber acts as resonance space of the resulting Helmholtz resonator and is thus also to be referred to here as the resonator chamber. Tuning to the sound frequencies to be reduced is achieved by positioning and dimensioning the wall opening(s) of the inner pipe in its intermediate section extending between the contact areas of the inner and outer pipe. The volume of the resonator chamber is not decisive for frequency tuning, however, it is decisive for the efficiency of sound reduction. In particular, the largest possible volume of the resonator chamber (for a given, typically limited chamber length) is desirable.

The above class-forming publication discloses a sound attenuator having multiple resonator chambers, the outer pipe of which is formed by a so-called internal high-pressure forming (IHU) method. For this purpose, a cylindrical outer pipe blank is clamped into a mold, the wall of which represents the desired outer pipe contour and is radially spaced from the outer wall of the outer pipe blank at least in some areas. The interior of the blank is then filled with an incompressible fluid, typically a hydraulic oil, and subjected to hydrostatic pressure. At sufficiently high pressure, the blank expands until it is in contact with the mold wall, whereby a plastic deformation occurs as a result of material flow, which is retained even after the pressurization has ended and the hydraulic oil has been drained. The forming tool is designed such that the blank retains its original diameter at its ends, and is expanded in the intermediate outer pipe section therebetween. In the preferred embodiment disclosed in this publication, the forming tool has an additional radial wall in its central axial area such that the blank does not undergo expansion at this point. Two axially adjacent, expanded intermediate outer pipe sections are formed, which are delimited by two terminal and one central constriction section. The outer pipe resulting from this forming of the blank is then fitted onto a cylindrical inner pipe, the dimensions of the inner and outer pipes being matched to one another in such a way that the outer wall of the inner pipe abuts against the inner wall of the outer pipe in the three constriction sections thereof.

The known sound attenuator is particularly intended for use in the exhaust line of a motor vehicle, especially in the connecting line of an exhaust gas turbocharger. The same principle of sound reduction can be applied to other fluid flow lines, for example to a refrigerant line of an air conditioning system, in particular in a motor vehicle. A problem with this application is the typically much smaller pipe cross-sections of the refrigerant line compared to the pipe cross-sections of conventional automotive exhaust lines. The stretching factor that can be achieved with the IHU method, i.e. the maximum achievable ratio of the diameter in the expanded section to the blank diameter, is limited. It is typically in the range between 1.5 and 2, depending on the material. Greater stretching comes with a risk of cracking of the material and/or excessively thin walls of the resulting formed pipe. Applying the known approach to small pipe diameters (downsizing) thus necessarily leads to significantly reduced chamber volumes (the volume scales with the square of the diameter), whereby, as explained above, the sound attenuation efficiency decreases. However, it is considered desirable to maintain the IHU method for the manufacture of sound attenuators even for smaller pipe diameters because of the particular economy and technical simplicity of this method.

SUMMARY

It is an object of the present invention to provide an improved sound attenuator and an improved method for its manufacture, such that sufficient sound attenuation efficiency is achieved even with small pipe diameters, despite retaining the IHU method.

This object is solved by a sound attenuator for a fluid flow line, comprising an inner pipe and an outer pipe coaxially encompassing the inner pipe. The outer pipe has a length and an inner surface that is spaced radially from an outer surface of the inner pipe over a major part of the length of the outer pipe. The outer pipe has at least two constriction sections of reduced diameter and spaced apart from each other axially. The inner surface of the outer pipe is connected to the outer surface of the inner pipe to form at least one axially and radially outwardly closed ring chamber that is in fluid-exchanging contact with an interior of the inner pipe via at least one opening in a wall of the inner pipe. The inner pipe has expansion sections of enlarged diameter corresponding to the constriction sections of the outer pipe. The expansion sections, in pairs, each axially delimit an intermediate inner pipe section containing the wall opening and having a reduced diameter relative to the expansion sections. The inner wall of the outer pipe in each of its constriction sections is connected to the outer wall of the inner pipe in its respective corresponding expansion section.

The object also is solved by a method that includes: providing an outer pipe blank; expanding the outer pipe blank in certain sections by means of an internal high-pressure forming method to produce an outer pipe with at least one expanded intermediate outer pipe section that is delimited axially on both sides by two constriction sections having a reduced diameter in relation thereto; coaxially sliding the outer pipe onto an inner pipe that is provided with at least one wall opening arranged in an intermediate inner pipe section such that the inner surface of the outer pipe abuts in its constriction sections against the outer surface of the inner pipe and the wall opening is positioned between the constriction sections; and connecting the outer surface of the inner pipe to the inner surface of the outer pipe in the constriction sections. The method is characterized in that the step of sliding the outer pipe onto the inner pipe is preceded by the following steps:

providing an inner pipe blank;

expanding the inner pipe blank in certain areas by means of an internal high-pressure forming method to produce the inner pipe with at least two expansion sections of enlarged diameter, which between them axially delimit the intermediate inner pipe section having a reduced diameter in relation thereto; and providing the inner pipe and/or the inner pipe blank with at least one wall opening in the intermediate inner pipe section.

The axial distance between the expansion sections of the inner pipe corresponds to the axial distance between the constriction sections of the outer pipe and the respective inner diameter of the outer pipe in its constriction sections corresponds to the outer diameter of the inner pipe in its corresponding expansion sections.

An aspect of the present invention is to design not only the outer pipe as a pipe of varying diameter, but likewise also the inner pipe.

The expansion and constriction sections correspond to each other in opposite ways, i.e. in places where (at those axial positions) the outer pipe has a constriction section, the inner pipe has an expansion section. These corresponding constriction and expansion sections are matched to each other in such a way that in them the inner wall of the outer pipe abuts against the outer wall of the inner pipe, such that both can be connected to each other—e.g. by welding, soldering, gluing, press fitting, etc. Axially between these contact areas, i.e. in the area of the intermediate inner and outer pipe sections, the inner pipe runs with a diameter constricted in relation to the contact areas with radial distance inside the outer pipe, which here has an enlarged diameter in relation to the contact areas. Thus, the chamber height corresponds to the sum of the pipe expansions of the inner pipe and the outer pipe. This summation of height allows the use of an IHU method (applied to the inner and outer pipe) even in cases where the known IHU forming (applied to the outer pipe only) would not result in a chamber volume sufficiently large to achieve a sufficiently efficient sound reduction.

As is generally known from the prior art, it is preferred that two of the constriction sections of the outer pipe as well as the expansion sections of the inner pipe associated therewith are arranged in the area of the two ends of the outer pipe. In other words, the outer pipe terminates axially on both sides with a constriction section and the inner pipe also preferably terminates axially on both sides with a constricted section respectively adjoining an axially outer expansion section, resulting in it preferably projecting beyond the outer pipe on both sides. This design is particularly advantageous, since the mechanical interfaces at which such a sound attenuator can be connected to further piping elements of the fluid flow line are thus located in areas of minimum diameter, enabling installation in piping systems with particularly small cross-sections.

Of course, the invention is not limited to single chamber sound attenuators. Systems with two or more axially adjacent resonator chambers are conceivable and preferred. For this purpose, it is provided that at least one outer pipe constriction section located farther inward axially and one inner pipe expansion section located farther inward axially associated therewith are arranged between two outer pipe constriction sections located farther outward axially and the inner pipe expansion sections located farther outward axially associated therewith. The provision of several ring chambers, corresponding to the provision of several resonators acting independently of each other, enables the targeted tuning of the sound reduction effect to different frequency ranges.

The connection between the inner wall of the outer pipe and the outer wall of the inner pipe can be made in different ways. In particular, it may be provided that the inner wall of the outer pipe in at least one of its constriction sections is welded, soldered, glued or press fitted to the outer wall of the inner pipe in its associated expansion section. Within the scope of the manufacturing method according to the invention, it may be provided in particular in this context that, before sliding the outer pipe onto the inner pipe, the outer surface thereof is coated in at least one of its expansion sections with a bonding coating, for example a glue coating or a solder coating. In the case of glue coating, a bonded connection results from the curing of the glue. In the case of a solder coating, subsequent heating leads to soldering of the two pipes.

The above-mentioned connection by welding, which is particularly preferred for the terminal edge areas, can encounter technical difficulties at the inner contact areas due to the poor accessibility. However, the person skilled in the art is familiar with implementation possibilities, such as so-called indirect resistance welding or alternative welding methods, such as vibration welding, with which a reliable welded joint can be produced even in places that are difficult to access for welding electrodes.

The contact surfaces with which the constriction sections of the outer pipe and the expansion sections of the inner pipe respectively associated therewith abut against each other are preferably cylindrical in shape. This allows the outer pipe to be slid onto the inner pipe smoothly and the two pipes to abut against each other over their entire surface in the contact areas. With precise manufacturing, a fluid-tight connection can be created between the inner and outer pipe, which then only requires an axial fixation to be made in any of the contact areas.

However, especially with cost-optimized production, manufacturing tolerances can lead to jamming of the pipes when they are slid on. To counteract this, a preferred further development of the invention provides that the cylinder diameters of the contact surfaces vary monotonically as a function of the axial position of the respective contact surface, i.e. they increase in one axial direction and respectively decrease in the opposite axial direction. The outer pipe, with the constriction section of the largest cylinder diameter leading, is then fitted onto the inner pipe which, with its expansion section of the smallest cylinder diameter leading, then dives into the outer pipe. During the sliding step, the non-associated constriction and expansion sections then slide past each other or through each other with low friction; only the associated constriction and expansion sections actually come into contact. The difference in diameter between two adjacent contact surfaces preferably corresponds to one to two times the manufacturing tolerance of the pipes. This corresponds to a generally desired minimization of the diameter differences and at the same time ensures that the above-mentioned, disadvantageous jamming of the two pipes during sliding is avoided.

For reasons of compressive strength of the sound attenuator according to the invention, kinks in the molding must be avoided as a matter of principle. With regard to axial installation space optimization, it would be desirable to have the sharpest possible design of the wall alignment changes occurring in the constriction and expansion sections. As a compromise, a preferred embodiment of the invention provides that the transition areas between the expansion and constriction sections, on the one hand, and the respective adjacent pipe areas, on the other hand, are formed in a rounded manner, wherein the radially further outward located rounding radii of each pipe are larger than the radially further inward located radii of the same pipe. In other words, the transition areas pressurized from the respective inner angle are formed as comparatively gentle curvatures, whereas the transition areas pressurized from the outer angle are formed at comparatively sharp angles, i.e. with small rounding radii.

Further details and advantages of the invention can be seen in the following special description and drawings.

DETAILED DESCRIPTION

Identical reference numbers in the Figures indicate identical or analogous elements.

Figure 1:
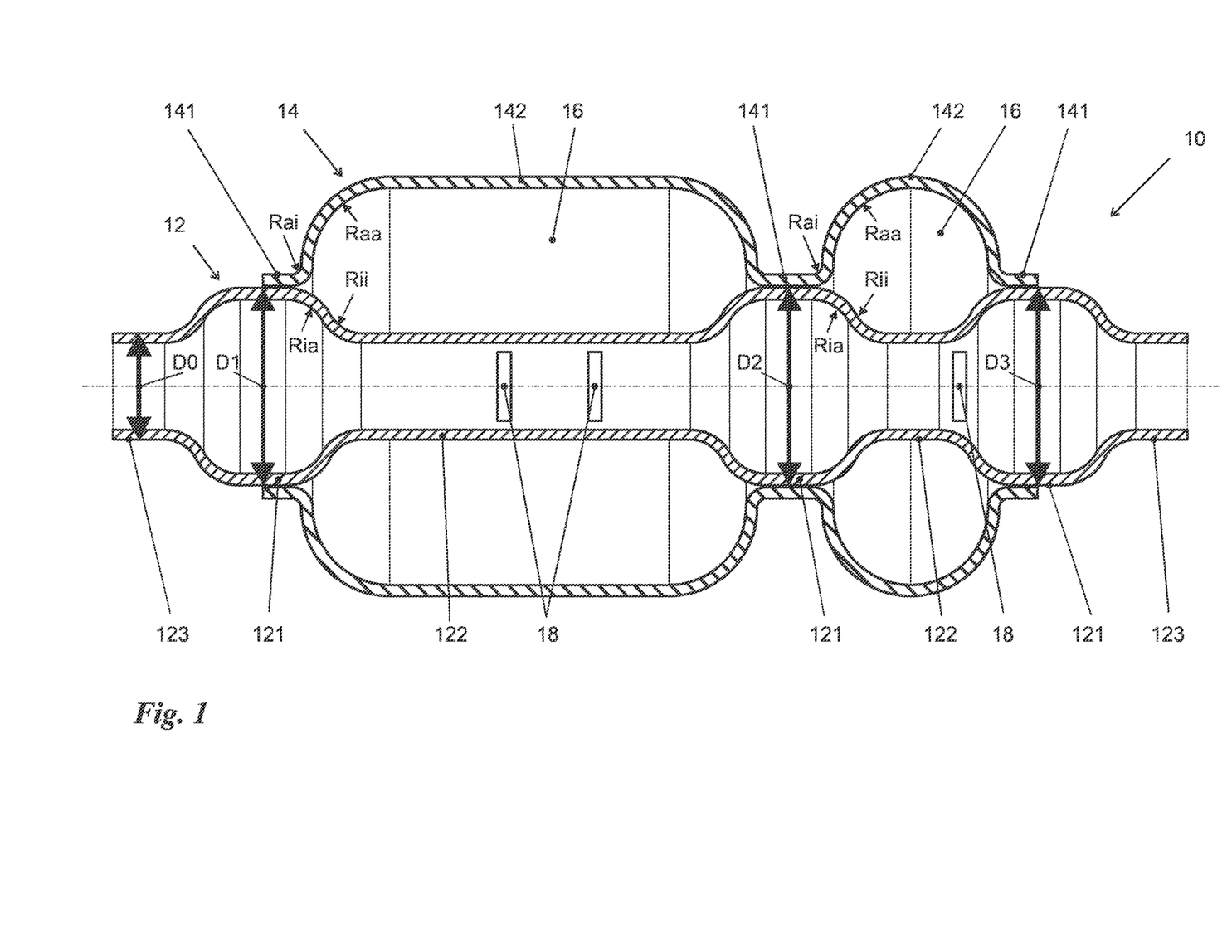
FIG. 1 is a cross-sectional view of an embodiment of a sound attenuator according to the invention.

FIG. 1 is a cross-sectional view of one embodiment of a sound attenuator 10 according to the invention. The sound attenuator 10 substantially has an inner pipe 12 and an outer pipe 14. The inner pipe 12 passes coaxially through the outer pipe 14. The inner pipe 12 has three expansion sections 121. Intermediate inner pipe sections 122 are located between the expansion sections 121.

Connecting pieces 123 are located axially outside of the outer two expansion sections 121. The connecting pieces 123, as well as the intermediate inner pipe sections 122, have substantially the same diameter, which is significantly smaller than the diameter of the expansion sections 121. In particular, the ratio of the diameters of the expansion sections 121 to the diameters of the intermediate inner pipe sections 122 or the connecting pieces 123 may be in the range of 1.2 to 2, preferably in the range of 1.4 to 1.6. Depending on the choice of material, this corresponds to the maximum stretching factor achievable by means of an internal high-pressure forming method. In the displayed embodiment, the central portions of the expansion sections 121 are cylindrically shaped.

The outer pipe 14 has three constriction sections 141 axially co-located with the expansion sections 121. Intermediate outer pipe sections 142 respectively extend between these. The diameters of the constriction sections 141 are significantly smaller than those of the intermediate outer pipe sections 142. In particular, the ratio of the diameters of the intermediate outer pipe sections 142 to the diameters of the constriction sections 141 may be about 1.2 to 2, preferably 1.4 to 1.6. Depending on the choice of material, this corresponds to the maximum stretching factor achievable by means of an internal high-pressure forming method. In the displayed embodiment, the central portions of the constriction sections 141 are cylindrically shaped.

The diameters of the axially co-located expansion sections 121 of the inner pipe and the constriction sections 141 of the outer pipe are matched such that the inner surface of the outer pipe 14 abuts against the outer surface of the inner pipe 12 at the corresponding axial positions. A bonded connection also may be established between the pipe walls at least at some, and preferably at all of these points. Such a bonded connection can be created, for example, by gluing, soldering or welding. Alternatively or additionally, a purely force-locking connection, i.e. a press fitting of the pipes 12, 14 in their mutual contact areas, may also be realized.

As a result, two ring or resonator chambers 16 are formed extending in the area of the intermediate pipe sections 122/142. The ring or resonator chambers 16 are closed in outward directions and are in fluid-exchanging contact with the interior of the inner pipe 12 via the openings 18 in the wall thereof. In the embodiment shown, the wall openings 18 are formed as rectangular gaps. Other, e.g. round, shapes may also be used.

The result is a sound attenuator acting according to the resonator principle and capable of being inserted with its connecting pieces 123 into a fluid flow line, for example a refrigerant line of an air conditioning system. The diameters D0 of the connecting pieces 123 are to be selected accordingly and may be provided with connecting elements, such as threads or the like.

The significance of the diameters D1, D2 and D3 of the cylindrical contact surfaces between the expansion sections 121 of the inner pipe 12 and the constriction sections 141 of the outer pipe 14 will be discussed in more detail below in the context of FIG. 4.

In operation, the sound attenuator 10 according to the invention may be subjected to significant internal pressures. On the other hand, an axially minimized installation space is desirable. Both objectives are in conflict with each other with respect to the diameter variation of the pipes 12, 14 explained above. The corresponding radii of curvature should be as large as possible in order to optimize the compressive strength, but as small as possible in order to minimize the installation length for a given chamber volume. The embodiment shown overcomes this conflict of objectives by means of an advantageous compromise: The respective radially outer radii of curvature of the pipes 12, 14, i.e. the outer radii Raa of the outer pipe 14 and the outer radii Ria of the inner pipe 12, are chosen to be larger than the further inward located radii, i.e. the inner radii Rai of the outer pipe 14 and the inner radii Rii of the inner pipe 12. This preferred embodiment of the invention thus provides that the curvatures pressurized from their inner curvature are formed with large radii for reasons of maximizing stability, while the curvatures pressurized from their outer curvature are formed with comparatively sharp angles, i.e. with smaller radii of curvature, for reasons of reducing the length of the overall component.

FIGS. 2a to 5 show some of the steps in the method of manufacturing the sound attenuator 10 of FIG. 1.

Figure 2A:
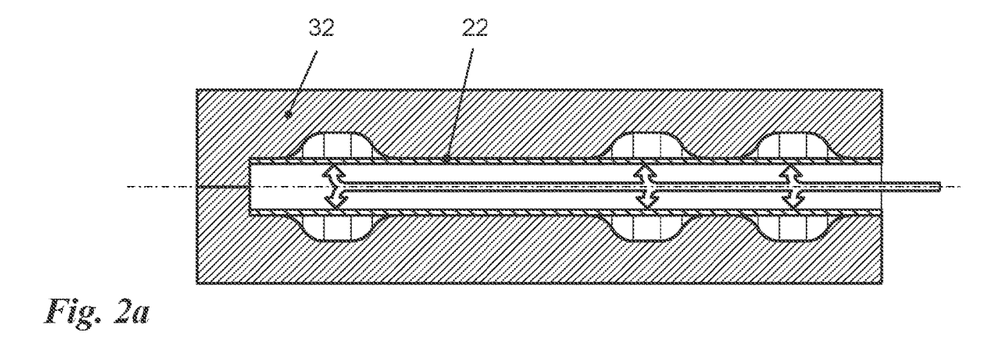
FIGS. 2a, 2b and 2c show three steps in the method of manufacturing the inner pipe of the sound attenuator according to FIG. 1.
Figure 2B:
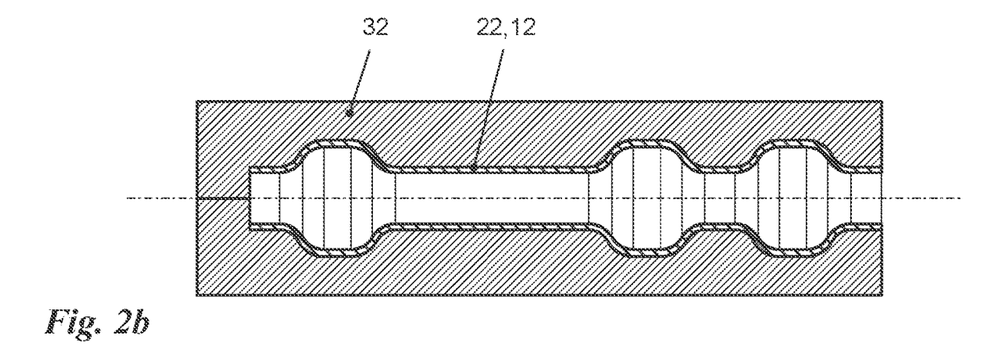
Figure 2C:
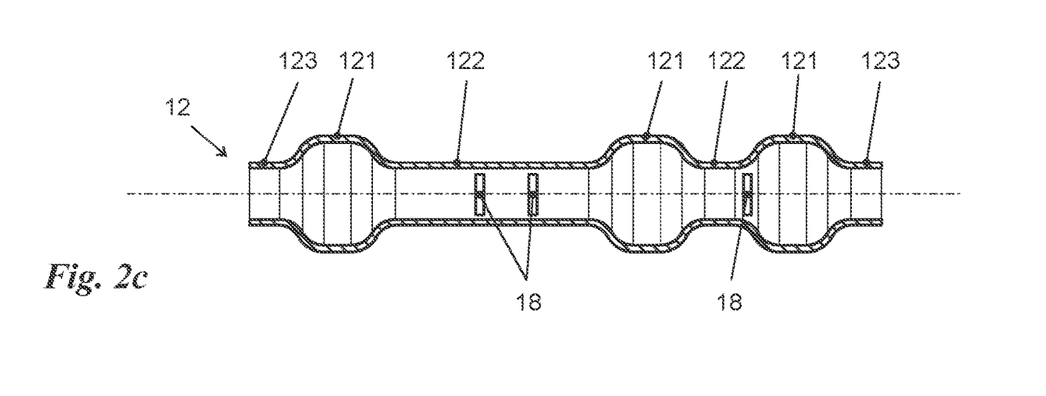
Figure 3A:
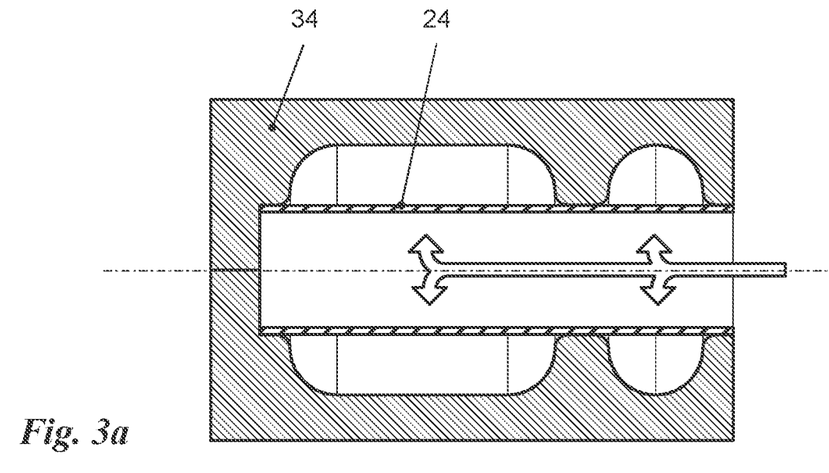
FIGS. 3a, 3b and 3c show three further steps in the method of manufacturing the outer pipe of the sound attenuator of FIG. 1.
Figure 3B:
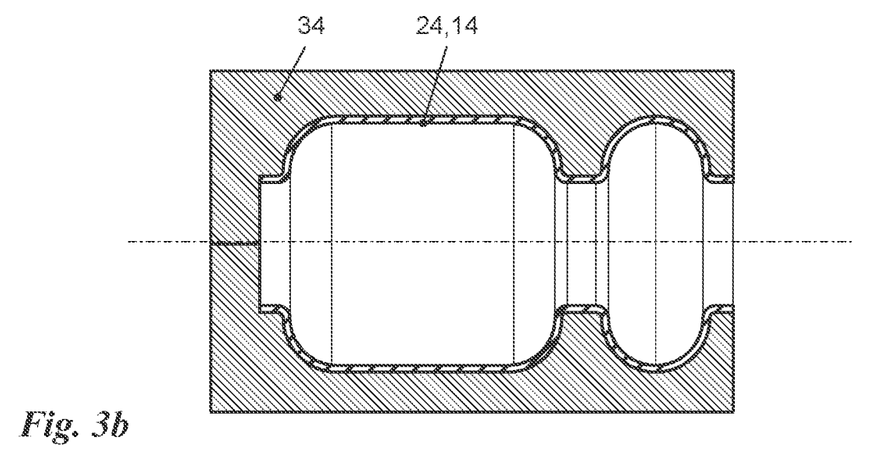
Figure 3C:
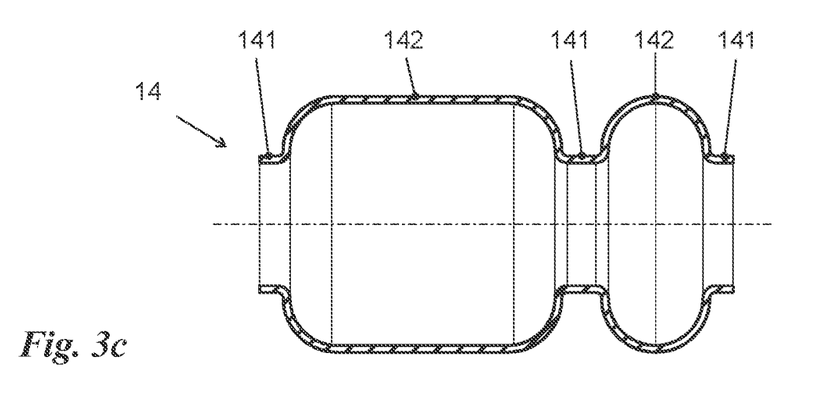

FIGS. 2a-2c shows the preferred method of manufacturing the inner pipe 12 in three steps. FIGS. 3a-3c shows the preferred method of manufacturing the outer pipe 14 in three steps. It will be understood by those skilled in the art that the individual pipes may be manufactured in any order, either sequentially or in parallel to one another. According to the invention, both pipes 12, 14 are manufactured by means of an internal high-pressure forming process. For this purpose, a cylindrical pipe blank, i.e. an inner pipe blank 22 or an outer pipe blank 24, is clamped into a mold, in particular into an inner pipe mold 32 or an outer pipe mold 34, which has the contour of the respective pipe 12, 14 to be manufactured. The blank 22, 24 is then filled with a hydraulic medium and pressurized, as respectively shown in FIGS. 2a and 3a, such that the blank material expands until it abuts against the wall of the mold 32, 34. With a suitable choice of material, particularly steel, copper or similar, a permanent, plastic deformation results. FIG. 2b or 3b shows the blank 22, 24 in the mold 32, 34 having been deformed to form the inner or outer pipe 12, 14. Subsequently, the finished pipe 12, 14 is removed from the mold 32, 34, wherein the inner pipe 12 can be subsequently provided with the wall openings 18. Their specific shape, as well as the choice of their number and positioning, depends on the desired tuning to sound frequency ranges that are to be particularly reduced. It will be understood by those skilled in the art that, in the context of the internal high-pressure forming process, the shown subsequent insertion of the wall openings 18 is advantageous. However, if the design of the inner pipe mold 32 provides suitable sealing, the inner pipe blank 22 may already be provided with said openings. It is also conceivable to insert the openings during the forming itself.

Figure 4:
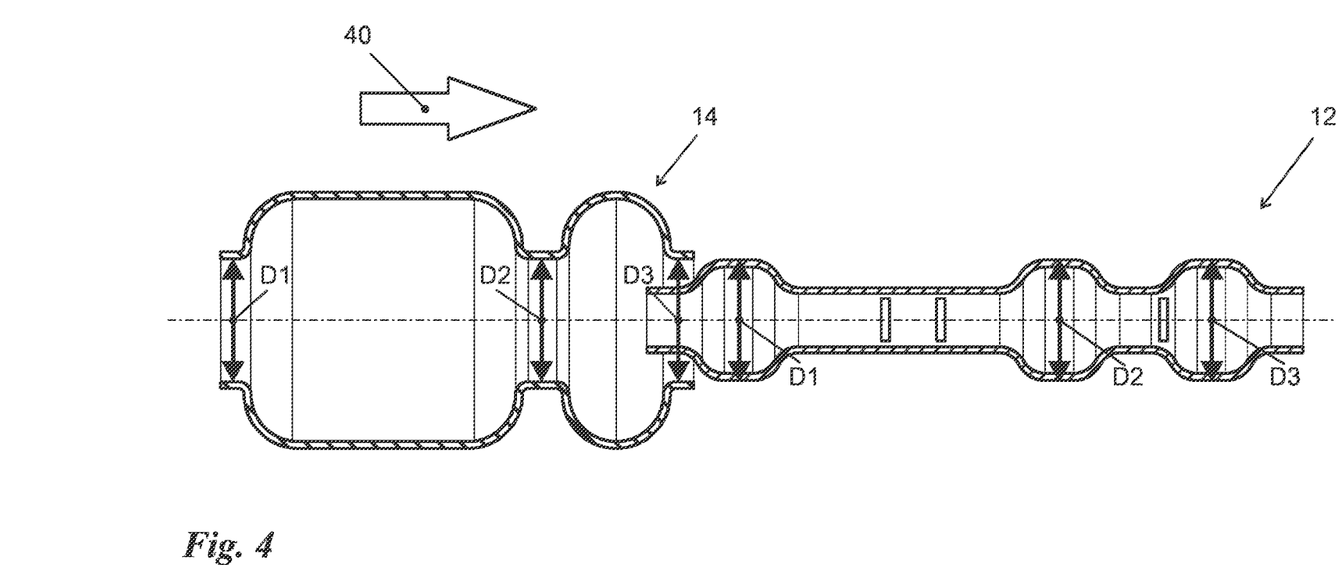
FIG. 4 shows a further step in the method of manufacturing the sound attenuator of FIG. 1.

Subsequently, as shown in FIG. 4, the two pipes 12, 14 are slid into each other. For the sake of simplicity, we will speak of sliding the outer tube 14 onto the inner tube 12, although the person skilled in the art will readily recognize that it is only the relative movement of the pipes 12, 14 that is important. This slide-on process can be facilitated by a particular choice of diameters D1, D2 and D3 of the cylindrical contact surfaces between the expansion sections 121 and the constriction sections 141. In particular, it may be provided that the diameters D1, D2, D3 following one another in the slide-on direction 40 increase, i.e. D1<D2<D3. This applies to both pipes 12, 14. In this way, the expansion sections 121 of the inner pipe 12 can be slid with particularly low friction through those constriction sections 141 of the outer pipe 14 with which they do not correspond in the finished sound attenuator 10. Only at the end of the slide-on process, i.e. when the respective corresponding expansion portions 121 and constriction portions 141 are slid into each other, do their diameters D1, D2, D3 coincide exactly, such that the corresponding outer wall portions of the inner pipe 12 and the corresponding inner wall portions of the outer pipe 14 come into contact with each other. Advantageously, the difference in diameter between two adjacent expansion or constriction sections 121, 141 is in the range of one to two times the manufacturing tolerance of the pipes, such that while the above-discussed facilitating effect during slide-on is effective, the absolute diameter differences remain minimized and have no effect on the fluid flow through the inner pipe 12.

Figure 5:
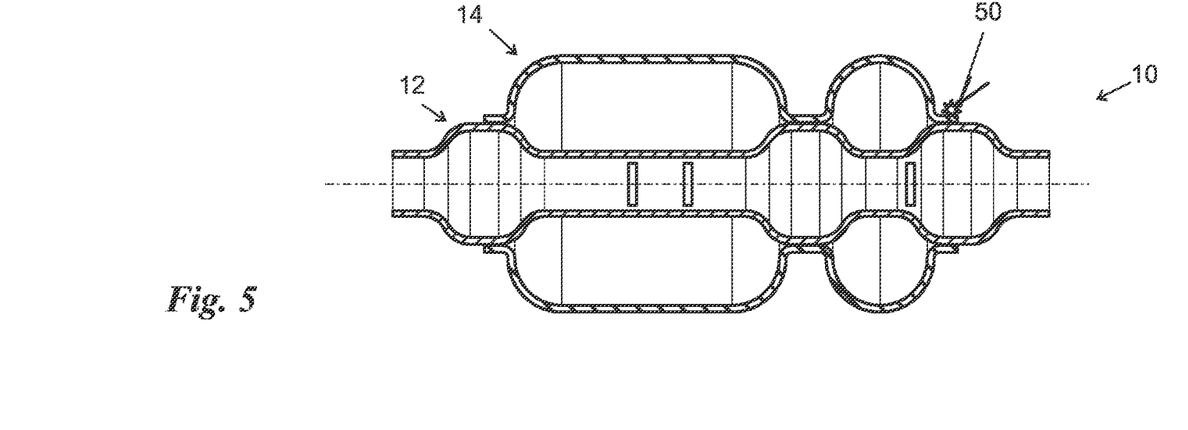
FIG. 5 is a final step in the method of manufacturing the sound attenuator of FIG. 1.

If the inner and outer pipes 12, 14 are not already press fitted together during the slide-on process, it may be advantageous to subsequently create a bonded connection between the pipe walls abutting against each other, as shown in FIG. 5. For example, this can be done by a welding 50 as shown in FIG. 5. Gluing or soldering is also conceivable, in which case the outer sides of the inner pipe 12 are provided with an appropriate bonding coating (glue, solder, . . . ) in its expansion sections 121 before the outer pipe 14 is slid on.

Of course, the embodiments discussed in the special description and shown in the Figures are only illustrative embodiment examples of the present invention. This disclosure provides the person skilled in the art with a wide range of possible variations. In particular, the number, shape and size of the chambers 16 as well as the design and arrangement of the wall openings 18 can be adapted to the requirements of the individual case.

REFERENCE SYMBOL LIST

10 Sound attenuator
12 Inner pipe
121 Expansion section of 12
122 Intermediate inner pipe section
123 Connecting piece
14 Outer pipe
141 Constriction section of 14
142 Intermediate outer pipe section
16 Ring chamber/resonator chamber
18 Wall opening
22 Inner pipe blank
24 Outer pipe blank
32 Inner pipe mold
34 Outer pipe mold
40 Slide-on direction
50 Welding
D0 Diameter of 123
D1, D2, D3 Contact surface diameter
Ria Outer radius of inner pipe
Rii Inner radius of inner pipe
Raa Outer radius of outer pipe
Rai Inner radius of outer pipe

What is claimed is:

1. A sound attenuator (10) for a fluid flow line, comprising a unitary one piece inner pipe (12) and a unitary one piece outer pipe (14) coaxially encompassing the inner pipe (12), the outer pipe (14) having a length and an inner surface that is spaced radially from an outer surface of the inner pipe (12) over a major part of the length of the outer pipe (14), the outer pipe (14) having first and second constriction sections (141) of reduced diameter and spaced apart from each other axially, the inner pipe having first and second expansion sections (121) expanded outwardly to define an enlarged diameter at axial locations corresponding respectively to the first and second constriction sections (141) of the outer pipe (14), the inner surface of the outer pipe (14) at the first and second constriction sections (141) being connected directly to the outer surface of the inner pipe (12) at the first and second expansion sections (121) respectively to form at least one axially and radially outwardly closed ring chamber (16), at least one opening (18) being formed through a wall of the inner pipe (12) between the first and second expansion sections (121) so that an interior of the inner pipe (12) is in fluid exchanging contact with the ring chamber (16), wherein the outer pipe (14) further comprises a third constriction section (141) and the inner pipe (12) further comprises a third expansion section (121), the inner surface of the outer pipe (14) at the third constriction section (141) being connected directly to the outer surface of the inner pipe (12) at the third expansion section (121); and the first and third constriction sections (141) and the first and third expansion sections (121) associated therewith are arranged in an area of two axial ends of the outer pipe (14).

2. The sound attenuator (10) according to claim 1, wherein
the inner pipe (12) projects axially beyond the outer pipe (14) on both axial ends of the outer pipe (14).

3. The sound attenuator (10) according to claim 1, wherein
the inner surface of the outer pipe (14) in at least one of its constriction sections (141) is welded, soldered, glued or press fitted to the outer surface of the inner pipe (12) in its associated expansion section (121).

4. The sound attenuator (10) of claim 1, wherein
contact surfaces with which the constriction sections (141) and the expansion sections (121) associated therewith abut against each another are cylindrically in shape.

5. The sound attenuator (10) according to claim 4, wherein
cylinder diameters (D1, D2, D3) of the contact surfaces vary monotonically as a function of the axial position of the respective contact surface.

6. The sound attenuator (10) according to claim 5, wherein
a difference in diameter between two adjacent contact surfaces corresponds to one to two times a manufacturing tolerance of the pipes (12, 14).

7. The sound attenuator (10) of claim 1, wherein
both the inner pipe (12) and the outer pipe (14) are respectively formed by an internal high-pressure forming method.

8. The sound attenuator (10) of claim 1, wherein
transition areas between the expansion and constriction sections (121; 141), and respectively adjacent pipe areas (122, 123; 142) are formed in a rounded manner, wherein radially farther outward rounding radii (Ria, Raa) of each pipe (12, 14) are larger than the radially farther inward rounding radii (Rii, Rai) of the same pipe (12, 14).

* * * * *